United States Patent [19]

Cillario

[11] 4,298,625
[45] Nov. 3, 1981

[54] SWEET PROTEIN FOOD PRODUCT IN THE FORM OF A FOAMED PLASTIC MASS

[75] Inventor: Renzo Cillario, Alba, Italy

[73] Assignee: P. Ferrero & C. S.p.A., Alba, Italy

[21] Appl. No.: 147,017

[22] Filed: May 6, 1980

[30] Foreign Application Priority Data

Sep. 11, 1979 [IT] Italy .................. 68798 A/79

[51] Int. Cl.³ .................................. A23G 3/00
[52] U.S. Cl. ......................... 426/572; 426/567; 426/602; 426/613; 426/657
[58] Field of Search ............ 426/587, 601, 602, 603, 426/613, 657, 572

[56] References Cited

U.S. PATENT DOCUMENTS

| | | | |
|---|---|---|---|
| 3,108,875 | 10/1963 | Bell | 426/587 X |
| 3,851,070 | 11/1974 | Sessoms et al. | 426/613 X |
| 4,051,269 | 9/1977 | Strinning | 426/603 |
| 4,091,118 | 5/1978 | de Rham | 426/587 X |
| 4,129,664 | 12/1978 | Kruseman et al. | 426/587 X |
| 4,228,190 | 10/1980 | Wallgren et al. | 426/603 X |

*Primary Examiner*—Robert A. Yoncoskie
*Attorney, Agent, or Firm*—Bernard, Rothwell & Brown

[57] ABSTRACT

The product consists of a foam of an "oil in water" emulsion formed from edible fat, milk proteins, water, and optionally added sugars, and having the natural pH of milk (6.2–7.5). The product may be obtained from an oil phase of edible fat and an aqueous phase of partially-skimmed, sweetened condensed milk having a viscosity of 2000–6000 cps at 20° C. and having, after heating to 80° C. and cooling to 40° C., a variation in viscosity at 40° C. not exceeding 1500 cps. Milk which is particularly suitable has a casein/serum protein ratio of from 2.8:1 to 3.2:1. The emulsion has a water content of from 17% to 35% and is physically and chemically stable for several months.

10 Claims, 3 Drawing Figures

SWEET PROTEIN FOOD PRODUCT IN THE FORM OF A FOAMED PLASTIC MASS

The present invention relates to a novel, sweet, protein food product, in the form of a foamed plastic mass having a consistency which may vary from that of a spreadable cream to that of a relatively thick paste which may be cut into slices.

U.K. Pat. No. 1,261,910 describes a process in which an aqueous dispersion of milk protein and lactose, which can be obtained from powdered skimmed milk, is incubated with thermo-bacteria which produce lactic acid. An edible fat may be present or added to the dispersion, whereby an acid emulsion is obtained which is then pasteurised, cooled and worked mechanically with the addition of inert gas. A spreadable, creamy product is obtained having an acidic pH not substantially greater than 5. The nutritive value of the product is obviously low owing to the absence of carbohydrates (sugars). Its acid taste can please only a limited group of consumers. Furthermore, the acidic pH contributes to the oxidisability of the product, causing difficulties in long-term preservation.

U.S. Pat. No. 4,051,269 describes a non-acidic, spreadable product, in the form of a "water in oil" emulsion, similar to margarine but rich in protein. It is obtained from an aqueous protein concentrate, including practically all the milk proteins but free from fats, lactose and dissolved salts. The proteins in the concentrate are denatured thermally in order to increase their water holding and their emulsifying properties and to increase the viscosity of the concentrate. The viscous concentrate is emulsified while hot with a vegetable oil and/or butter; the emulsion obtained is pasteurised and then cooled to the storage temperature. This product is also "incomplete" from a nutritive point of view, mainly through lack of sugars and salts which are normally present in milk. Admittedly the stability and preservability of the product are satisfactory mainly due to the fact that the "continuous phase" of the product is the oil phase and not the aqueous one.

An object of the present invention is to make, with the aid of milk, a sweet product as stated above, which contains all the proteins, lactose and salts present in the milk that is used, and which consists of an "oil in water" emulsion (similar to milk and to ordinary milk cream, and unlike margarine and butter which are "water in oil" emulsions), the said product being structurally stable and capable of long-term storage.

A particular object of the invention is to provide a substantial proportion of fats in the said product, preferably from 25% to 45% by weight, a suitable proportion of sugars (in addition to the lactose), preferably from 25 to 40% by weight, and also a high water content, generally from 17% to 35% by weight, and preferably at least 20% by weight, without risk of physical or chemical degradation during the storage period. A further specific object is to make a product in which the lactose present does not form crystals of a size perceptible to the consumer.

It has not been possible to conceive of a product fulfilling these requirements until now, mainly because it was thought that the presence of the aqueous phase in the form of the "continuous phase", particularly in the high proportion indicated above, would not have enabled a physically and chemically stable product, that is a marketable product, to be obtained. The Applicant himself has recently attempted to make a sweet protein food product, somewhat similar to that specified in the first paragraph of the present specification on page 2, but with results, which were not only unsatisfactory but also inexplicably variable and, hence, difficult to reproduce on a commercial scale.

The present invention results from the discovery that the desired product may be obtained by using partially-skimmed, sweetened condensed milk, conforming to international standards, but having a viscosity at 20° C. of from 2000 to 6000 cps (Brookfield RVT viscometer, no. 6 rotor, 50 RPM), and, after heating to 80° C. and subsequent cooling to 40° C., a variation in viscosity at 40° C. to not more than 1500 cps, and preferably not more than 600 cps. It has also been discovered that partially-skimmed, sweetened condensed milk, particularly suitable for making the product in question, should have a "protein ratio" of from 2.8:1 to 3.2:1 (preferably substantially 3,0:1), where by "protein ratio" is meant the weight ratio of the casein to the serum protein (lacto-albumin and lacto-globulin) present in the milk. One object of the present invention, therefore, lies in the use of a partially-skimmed, sweetened condensed milk for the purpose of manufacturing a product of the type specified in the first paragraph of the present specification on page 2.

Furthermore, the invention also provides a sweet protein food product, in the form of a foamed plastic mass, consisting essentially of an "oil in water" emulsion formed from edible fat, milk protein and water, having a pH of from 6.2 to 7.5 (which is substantially the natural pH of milk) and having characteristics which may be obtained by a process including the following stages:

(a) the preparation of an "oil in water" emulsion at 55°–65° C. with from 75 to 55% by weight of an aqueous phase comprising at least 70% by weight of partially-skimmed, sweetened condensed milk and, correspondingly, from 25 to 45% by weight of an oil phase comprising at least 98% by weight of one or more edible fats, and in which:

the said condensed milk has a viscosity of 2000–6000 cPs at 20° C. and a variation in viscosity at 40° C. not exceeding 1500 cps, preferably not exceeding 600 cps;

The protein content of the emulsion consists entirely of milk proteins including casein and serum protein (lacto-albumin and lacto-globulin);

the emulsion contains water added in such quantity that the total water content is from 17% to 35% by weight and the protein/water weight ratio is from approximately 12:1000 to approximately 36:100;

(b) pasteurisation of the said emulsion at a temperature of 90°–110° C. for a time not exceeding about 18 seconds, evaporation of the water content of the emulsion being avoided;

(c) intimate seeding of the pasteurised emulsion with lactose microcrystals added in a quantity not exceeding 1% by weight, but amounting to at least 0.015% by weight of said pasteurised emulsion, operating at a temperature of 45°–55° C. and foaming the seeded emulsion by means of the intimate incorporation of an inert gas;

(d) cooling the emulsion to a temperature not greater than 20° C. under mechanical beating for a sufficient length of time to produce crystallisation of at least part of the edible fat content of the emulsion;

(e) packaging or storing the cooled emulsion under sterile conditions.

According to a preferred embodiment, in addition to the saccharose resulting from the sweetened condensed milk, the aqueous phase employed in stage (a) contains at least one added sugar, other than lactose, such that the total quantity of sugar, other than lactose, is within the range of from about 25% to about 40% by weight of the weight of the emulsion. The added sugar may for example be saccharose, glucose, fructose, invert sugar and/or honey.

Further characteristics and advantages of the invention will emerge from the description which follows.

In the attached drawings

As has been indicated above, the product of the invention has a pH which is substantially the same as the natural pH of milk (typically about 6.6) and a consistency which varies from that of a cream to a paste. The typical physical characteristics of the creamy and paste-like products respectively are tabulated, for guidance, in the following Table.

|  | Creamy Products | | Paste-like products | |
| --- | --- | --- | --- | --- |
|  | Typical values | Optimum | Typical values | Optimum |
| Total proteins (%) | 4.24–6.36 | 4.77 | 3.92–5.88 | 4.41 |
| Total fats (%) | 25–45 | 34.5 | 25–45 | 33.5 |
| Lactose (%) | 5.83–7.95 | 6.9 | 5.39–7.35 | 6.4 |
| Total water (%) | 18–35 | 25 | 17–25 | 23 |
| Sugars other than lactose (%) | 25–35 | 28 | 25–40 | 30.5 |
| $\frac{Protein}{water} \times 100$ | 13–36 | 19.1 | 15–35 | 19.2 |
| Viscosity cps | approx. 400,000 | | approx. 3,500,000 | |

In the Table the percentages are by weight. The viscosity was determined with the use of a Brookfield RVT viscometer, Helipath Stand rotor F; 2.5 r.p.m. at 20° C.

In every case, the product contains an inert gas, typically nitrogen, in the form of an intimately dispersed gaseous phase, generally in an amount of from 20 to 50% by volume, preferably 30–40% by volume with respect to the volume of the product.

The basic raw material for obtaining the product according to the invention is partially-skimmed, sweetened condensed milk. According to regulations currently in force, such milk includes 24–26% by weight of water, approximately 5% by weight of cow fat and 44–46% by weight of added sugar (saccharose); therefore, the condensed milk has a milk protein content of from 8 to 12% by weight (9.5–10% average) and a lactose content of approximately 12% by weight, and contains also salts and other dry matter peculiar to cow's milk.

Figure 1:
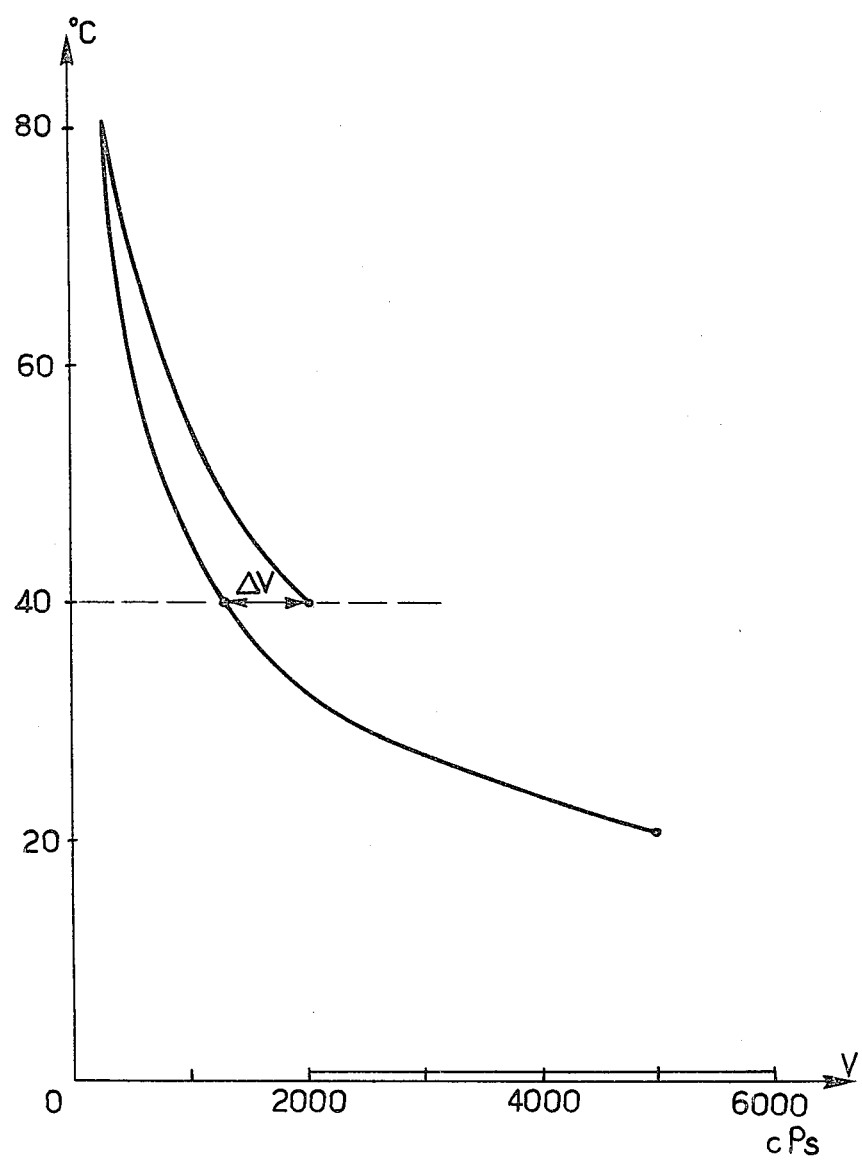
FIG. 1 is an explanatory diagram relating to the rheological characteristics of the condensed milk used, with viscosity values in cPs (abscissa) shown in dependence on the temperature in °C. (ordinate).

For the purposes of the present invention, the viscosity of the condensed milk should be from 2000 to 6000 cPs at 20° C. (determined as specified above) and this viscosity range is marked in FIG. 1. Furthermore, for the purposes of the invention, the condensed milk should pass a rheological test in which:

the milk is heated from 20° C. to 80° C. over a period of 18 minutes (±2 minutes) and then cooled to 40° C. over a period of 10 minutes (±2 minutes) and the viscosity values are determined at the various temperatures, in particular at 40° C.

The variation in viscosity $\Delta V$ (see FIG. 1) at 40° C. should not exceed 1500 cps, and should preferably not exceed 600 cps. Many types of partially-skimmed, sweetened condensed milk, marketed by various producers, have a value of $\Delta V$ of 2000–3500 cps, and these types of milk have been shown to be completely useless for the purpose of the present invention. A $\Delta V$ of 1500 cps, as indicated above, is the maximum that can be tolerated.

Apparently the rheological characteristics indicated above are a function of the "protein ratio" (as hereinbefore defined) of the condensed milk. From experimental tests it has been shown that, when a partially-skimmed and sweetened condensed milk has a protein ratio of from 2.8:1 to 3.2:1 (more particularly, substantially 3.0:1), this milk is suited to the making of the product according to the invention. According to an aspect of the invention this protein ratio should also characterise the emulsion obtained in the stage (a) indicated above. In the majoirty of practical cases, the protein ratio of the condensed milk is readily outside the range indicated above; in these cases, according to the invention, said ratio may artificially be brought within the aforesaid range by the addition, during stage (a), of the milk protein(s) which is (are) lacking. In the most frequent cases, the protein ratio is greater than 3.2:1 (and may even be as high as 4:1, which signifies deficiencies in lacto-albumin and lacto-globulin, that is in the serum proteins; it therefore suffices to add, during stage (a), the necessary quantity of these serum proteins, for example in the form of serum obtained as a residue from other processes, provided these serum proteins have not already been denatured or substantially denatured.

In practice, in order to carry out stage (a), the aqueous phase and the oil phase are prepared separately. The permitted proportions of the two phases in the emulsion have already been given above. Preferably the aqueous phase amounts to 62–70% and the oil phase, correspondingly, to 38–30% by weight, of the weight of the emulsion. In the embodiment which is particularly preferred, the aforesaid phases should amount to 67–69% by weight and 33–31% by weight respectively.

In the aqueous phase, the quantity of partially-skimmed, sweetened condensed milk is at least 70% by weight and may even amount to approximately 85% by weight, especially in the absence of added sugars. However, the aqueous phase typically contains at least one added, dissolved sugar, and then the proportion of condensed milk in the said phase is 70–81%, preferably 72–79% by weight. The aqueous phase also contains added water, in such proportion that the water content of the emulsion formed in stage (a) is about 17% to about 35% by weight, preferably about 22–28% by weight. In this calculation the amount of any added, deficient proteins has been disregarded, since, in every case, it does not exceed 1% by weight. To summarize, it may be said that the aqueous phase is the condensed milk diluted with water, preferably with an aqueous solution containing added sugar. In the condensed milk, the protein content preferably includes 74.9% by weight of casein, 19.7% of lacto-albumin and 5.4% of lacto-globulin (protein ratio 2.98:1). For preference, the added sugar should consist of in part saccharose and in part glucose or honey. Thus, in a preferred embodiment, the aqueous phase may contain 4-5% by weight of added saccharose (in addition to that already in the condensed milk) and 0.5-1% weight of glucose or 8-12% by weight of honey.

The oil phase comprises 98-99,5% by weight of one or more edible fats. The remaining 2-0.5% (preferably 0.9-1.1%) consists of monoglycerides having an emulsifying action. The edible fat may consist of cow butter or a vegetable fat (palm oil is typical), singly or mixed together. For example, the best results are obtained with approximately 2 parts by weight of palm oil to one part by weight of butter.

The two phases are prepared at a temperature (generally 55°-65° C., preferably 60° C.) such that the oil phase is liquid, and then they are emulsified together in an emulsifier, for example, of the revolving agitator type (1500 revolutions per minute). According to the invention, it is recommended that, especially in order to obtain a product with a creamy consistency, the emulsifying stage (a) be terminated with an homogenizing operation under relatively low pressure, of 30-50 bar. With higher pressures the viscosity of the homogenized emulsion would be too high and would render the execution of the subsequent stages difficult.

Stage (b), pasteurisation, is preferably carried out in a continuous process by means of scraped-surface tubular heat exchangers, generally known under the name "Votator" and commonly used in the production of margarine. It is important that, after a temperature of 90°-100° C. has been reached (preferably 100° C.), the emulsion is maintained at this temperature for no longer than 18 seconds, preferably from 8 to 12 seconds. Furthermore, during the pasteurization, water loss by evaporation should be avoided, so that the whole of the initial water content still remains in the finished product. To this end it suffices for the flow of emulsion through the Votator (and up to the subsequent apparatus) to occur under a hydraulic pressure sufficient to prevent evaporation, for example 5 bar. By this treatment both the pasteurization of the emulsion and a degree of denaturization of the proteins, which is "in harmony" with the conditions described above in relation to the rheological "test" and the protein ratio are obtained.

From this point onwards, all the subsequent stages are carried out under sterile conditions and none of these stages involves temperatures above 80° C.

After pasteurization, therefore, the emulsion is preferably cooled rapidly to the temperature of stage (c), that is to 45°-55° C., this cooling possibly being carried out in a continuous process using a Votator connected to the outlet of the pasteurization Votator. One object of stage (c) is to prevent, during the subsequent cooling of the emulsion, the uncontrolled precipitation and growth of lactose crystals from that lactose which has up till now been dissolved in the aqueous phase. Lactose shows a considerable tendency to form relatively large crystals, the presence of which in the finished product would be disagreeable to the consumer. Hence stage (c) is carried out at a temperature at which the aqueous phase is saturated, or almost saturated with lactose, and the seeding of the emulsion with imperceptible microcrystals of lactose provides (according to known principles) large numbers of crystallization nuclei on which the dissolved lactose may subsequently crystallize without forming crystals which would be perceptible in the mouth of the consumer. The quantity of microcrystals added, as given above, is sufficient to obtain this result. In practice, when operating continuously, it is useful to prepare a suspension of the said microcrystals separately in a non-aqueous flavoring liquid and to inject this suspension continuously into the flow of emulsion issuing from the cooling Votator at 45°-55° C. Immediately downstream of the respective injector, a second injector may be provided for injecting a measured flow of the foaming gas, generally nitrogen, into the seeded flow.

In order to obtain an intimate distribution of the microcrystals and small gas bubbles, the flow of emulsion treated as just described is preferably fed continuously to a further Votator, which also cools the emulsion, to a temperature not greater than 20° C., in accordance with stage (d). The vigorous mechanical action exerted on the emulsion by this Votator is extremely effective in assisting this intimate distribution, whilst, at the same time, the lowering of the temperature induces crystallization of the lactose on the crystallization nuclei thus intimately distributed. Obviously, the viscosity of the emulsion increases with the lowering of the temperature, thus flavoring the stability of the final product and preventing the impalpable lactose crystals in the aqueous phase from uniting to form larger crystals. This, however, would not suffice to obtain the desired stability of the product with absolute certainty. To achieve such certainty, it is necessary for at least that part of the cooling during which the emulsion is at temperatures below about 28°-36° C. to be carried out over a period long enough to enable a suitable part of the fat content of the emulsion to crystallize during the cooling process, thus further increasing the viscosity and stability of the emulsion. Moreover, it is convenient for the cooling to be continued down to a temperature of 18°-12° C. Given the variety of possible compositions for the oil phase, it is difficult to fix a universally valid minimum for the fat component which should crystallize during the cooling. Purely by way of guidance one can mention at least 20%, preferably 30%. As an alternative valid indication, one may say that the cooling from approximately 28°-36° C. to approximately 12°-18° C. should be carried out over a period of not less than about 20 seconds. In practice, in order to obtain these results, the emulsion resulting from stage (c) may be passed first through a first Votator, to be cooled to 28°-36° C. in any time whatsoever, and then through a second Votator adjusted to effect further cooling over a period of not less than 20 seconds. Normally a product with a paste-like consistency requires a longer period than that required by a product with a creamy consistency.

The cold, foamed mass obtained in stage (d) has a specific gravity of about 0.60 to about 0.75 and a viscosity (measured as specified above) at 20° C. of approximately 300,000 cps to more than 3,000,000 cps. For packaging, portions of this mass may be deposited in sealable containers, for example in plastic pots of 300-500 ml capacity, suitable for sale to the public. The product of pastelike consistency may be extruded as blocks or slices and then packaged, for example in flexible, sealed wrappings of laminated film. Naturally the product may also be used immediately as a component in the production of other sweet products, or stored temporarily under sterile conditions in suitable containers. In every case the product, when kept under sterile conditions in closed containers, may be stored for at least six months at temperatures of around 15° C. or lower.

In a preferred embodiment, particularly applicable to products of a creamy consistency, the cooling of the emulsion from the pasteurizing temperature (90°–110° C.) to the temperature of stage (c) is preferably carried out in two steps with an intermediate homogenization treatment. More particularly, the flow of emulsion which has just been pasteurised may be passed through a first cooling Votator to be cooled to approximately 75°–80° C., then homogenized by passage through a conventional homogenizer at a pressure of 150–200 bar, and then cooled to 45°–55° C. by passage through a second cooling Votator. It has been found that this treatment, which results in an increase in the viscosity of the emulsion, eliminates all risk of instability of the emulsion in the subsequent stages (c) and (d). This treatment is particularly to be recommended when, in a continuously operating plant, the flow of pasteurised, cooled emulsion is not conveyed directly to the injectors of stage (c), but passes through a storage tank (fitted with agitators) maintained at 45°–55° C.

EXAMPLE 1

Figure 2:
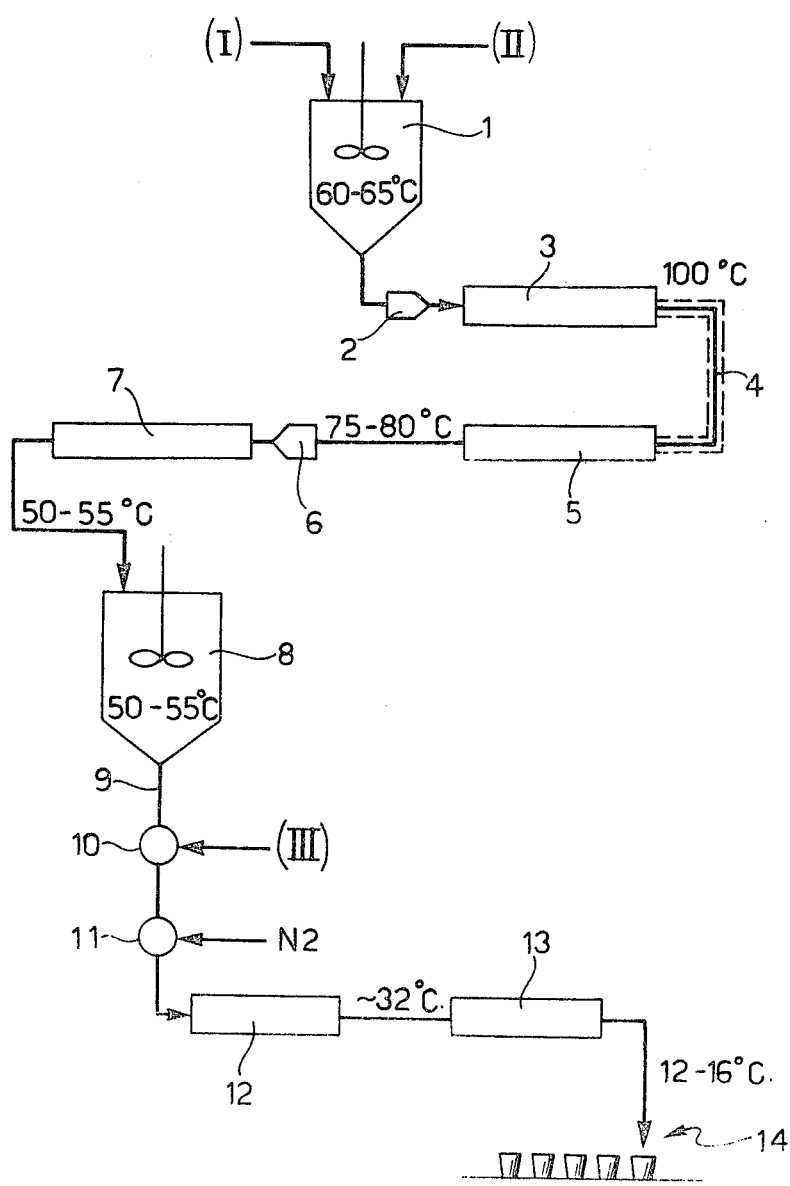
FIGS. 2 and 3 are block-diagrams illustrating the embodiments described in Examples 1 and 2, respectively.

With reference to FIG. 2, in order to obtain 100 kg. of product of a creamy consistency 66.98 kg. of an aqueous phase (I), 32.0 kg of an oil phase (II) and 1.02 kg of a suspension (III) of lactose microcrystals in a flavoring liquid are prepared separately.

The aqueous phase is prepared by dissolving 3.0 kg. of saccharose and 0.5 kg. of glucose in 10.5 kg. of water and mixing the solution obtained with 52.98 kg. of partially-skimmed, sweetened condensed milk. This is carried out at 60° C. The proteins in the condensed milk consist of 74.94% by weight of casein, 19.66% by weight of lacto-albumin and 5.40% by weight of lacto-globulin, whereby the protein ratio is 2.99:1. The condensed milk contains 26% by weight of water and 11% by weight of proteins whereby the aqueous phase has a total water content of 24.28 kg. and a protein/water weight ratio of 24:100. Furthermore, the said condensed milk contains 5% by weight of fat and 46% by weight of saccharose. The total quantity of sugars, other than lactose, in the aqueous phase is therefore 27.9 kg.

The oil phase is prepared by forming a solution at 60° C. of 21.7 kg. of palm oil, 10.0 kg. of cow butter and 0.3 kg. of monoglycerides.

The suspension of lactose microcrystals is prepared by maintaining 0.02 kg. of the said microcrystals under continuous agitation is 1 kg. of flavoring liquid consisting of a solution of 0.02 kg. of vanillin in 0.98 kg. of ethanol.

The aqueous phase is poured into an emulsifier (1) maintained at 60°–65° C. and fitted with an agitator rotating at 1500 revolutions/minute, after which the oil phase is added gradually. The resulting "oil in water" emulsion is homogenized in a continuous flow by means of passage through a homogenizer (2) at a pressure of 40 bar, to the outlet of which is connected a Votator (3) which heats the flow continuously to 100° C.; the flow is maintained at this temperature for 12 seconds by passage through a tube (4) connected to the outlet of the Votator (3) and maintained at the said temperature. The said tube (4) opens into a first cooling Votator (5), which cools the flow to 75°–80° C. The hydraulic pressure necessary to permit passage of the flow through the Votators (3,5) is supplied by the said homogenizer (2). The flow cooled to 75°–80° C. is fed to a second homogenizer (6) operating at 180 bar, and thence passes through a second cooling Votator (7) which cools it to 50°–55° C. The cooled flow is collected in a storage tank (8), provided with an agitator and maintained at the said temperature.

To the bottom of the storage tank is connected a downwardly-leading tube (9) into which opens a first injector (10) and, a little lower down, a second injector (11). To the first injector (10) are fed 10.3 g. of microcrystal suspension for every kilogram of emulsion which flows through the tube (9). To the second injector (11) are fed 400 N cc of gaseous nitrogen for every liter of emulsion. The downwardly-leading tube (9) opens into a first cooling Votator (12), in which the flow of emulsion is cooled to approximately 32° C., and the outlet of which is connected to a second cooling Votator (13) through which the flow of emulsion passes at such a speed that it is cooled to 12°–16° C. in 24 seconds. The passage of the flow through these two Votators (12, 13) is caused by the head of pressure in the storage tank (8) mentioned above. The flow leaving the second Votator (13) at 12°–16° C. passes to a filling device (14) to be made up into portions in plastic pots as mentioned above.

The product obtained has a pH=7.2, a specific gravity of 0.70 g/cc and a viscosity of approximately 400,000 cps (determined as specified above). It has a white creamy appearance. The taste is that of sweet milk cream aromatized with vanillin. The product keeps unaltered for at least 6 months in refrigerated cabinets.

EXAMPLE 2

Figure 3:
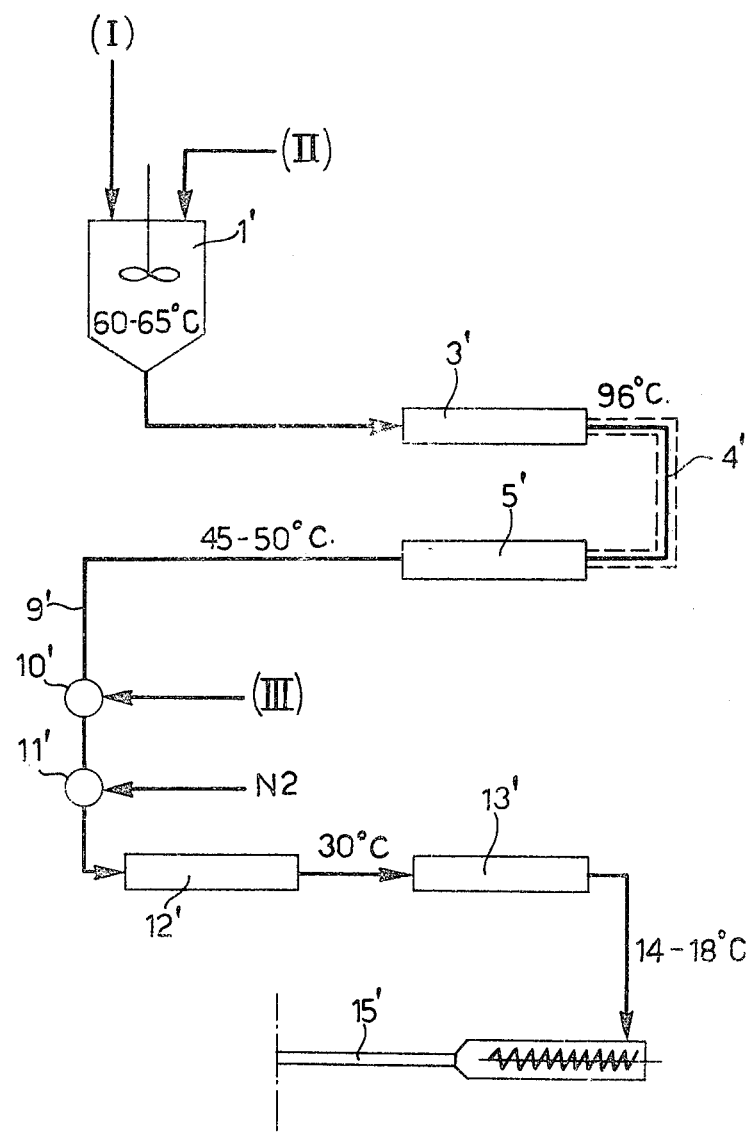

With reference to FIG. 3, for 100 kg. of product of a paste-like consistency, 67.4 kg. of an aqueous phase (I), 31.3 kg. of an oil phase (II) and 1.3 kg. of a suspension (III) of lactose microcrystals are prepared separately.

The aqueous phase is prepared by dissolving 3.0 kg. of saccharose and 7.0 kg. of honey in 8.3 kg. of water at 85° C. 49.1 kg. of partially-skimmed, sweetened condensed milk are added to the solution obtained and the aqueous phase thus formed is brought to 60° C. The composition of the condensed milk is the same as in Example 1. Hence, the total water content in the aqueous phase amounts to 25.8 kg. The protein content is 7.4 kg., whereby the protein/water weight ratio is 28.7:100. The total content of sugars other than lactose is 41 kg. The protein ratio is that in Example 1, that is 2.99:1.

The oil phase is prepared by dissolving 0.3 kg of monoglycerides in 31 kg of palm oil at 60° C.

The dispersion of the lactose microcrystals is prepared by maintaining 0.016 kg. of microcrystals under agitation in 1.284 kg. of the alcoholic vanillin solution of Example 1.

The two phases, aqueous and oil, are emulsified as in Example 1 in an emulsifier (1'), and the "oil in water" emulsion thus obtained is fed continuously, directly to the pasteurizing Votator (3'), without passage through an homogenizer. Pasteurization is effected by heating to 96° C., with a stay time of 15 seconds, after which the flow of emulsion is cooled in a Votator (5') to 45°–50° C. To the outlet of the cooling Votator (5') is connected a downwardly-leading tube (9') fitted with two respective injectors (10', 11'). To the first injector (10') are fed 13.2 g of microcrystal suspension for every kilogram of emulsion flowing through the tube (9') whilst 470 N cc of gaseous nitrogen are fed to the second injector (11') for each liter of emulsion. The resulting flow passes continuously through a first Votator (12'), which cools it to 30° C., and then through a second Votator (13'), which cool it to 14°–18° C. over a period of 36 seconds. The cold product which is obtained is extruded in the form of a bar (15'), which may be cut into slices. These slices may be packaged in sealed, flexible wrappings, or used immediately to produce other sweet products (for example in which the slice of product according to the invention constitutes a component layer).

The product obtained has a pH of 7.1, a specific gravity of 0.64 g/cc and a viscosity of approximately 3,500,000 cps (measured as specified above). It has a white appearance and the taste is again that of sweet milk cream aromatized with vanillin. This product may also be stored unaltered for at least 6 months in refrigerated cabinets.

What is claimed is:

1. Sweet protein food product, in the form of a foamed plastic mass consisting essentially of an "oil in water" emulsion formed from edible fat, milk proteins, sugar and water, having a pH of from 6.2 to 7.5 and obtainable by a process comprising the steps of:
   (a) preparing an "oil in water" emulsion at 55°–65° C. with 75–55% by weight of an aqueous phase comprising at least 70% by weight of partially-skimmed, sweetened condensed milk and 25–45% by weight of an oil phase comprising at least 98% by weight of at least one crystallizable edible fat, and in which:
   the said condensed milk has a viscosity of from 2000 to 6000 cps at 20° C. and a variation in viscosity at 40° C. not exceeding 1500 cps after heating to 80° C. and subsequent cooling to 40° C.;
   the protein content of the emulsion consists entirely of milk proteins including casein and serum protein;
   the emulsion contains water in amounts from 17% to 35% by weight and the protein/water weight ratio is from about 12:100 to about 36:100;
   (b) pasteurizing the said emulsion at a temperature of 90°–110° C. for a time not exceeding about 18 seconds while avoiding evaporation of the water content of the emulsion;
   (c) rapidly cooling the pasteurized emulsion to 45°–55° C. and intimately seeding the pasteurized emulsion with lactose microcrystals added in a quantity at least 0.015% but not exceeding 1% by weight and foaming the seeded emulsion by means of the intimate incorporation of an inert gas;
   (d) cooling the emulsion to a temperature not greater than 20° C. under mechanical beating for a sufficient length of time to produce crystallization of at least part of the edible fat content of the emulsion;
   (e) packaging or storing the cooled emulsion under sterile conditions.

2. The product of claim 1, wherein in addition to the saccharose resulting from the sweetened condensed milk, the aqueous phase used in stage (a) contains at least one added sugar, other than lactose, such that the total content of sugars other than lactose is from about 25% to about 40% by weight with respect to the weight of the emulsion.

3. The product of claim 2, wherein said added sugar is selected from the group consisting of saccharose, glucose, fructose, invert sugar and honey.

4. The product of claim 1, in which the said condensed milk has a casein/serum protein weight ratio of from 2.8:1 to 3.2:1.

5. The product of claim 1, in which the said condensed milk having a casein/serum protein weight ratio outside the range 2.8:1–3.2:1 is brought within the said range by means of the addition of the deficient protein.

6. The product of claim 1, in which the edible fat in the oil phase of stage (a) consists of palm oil or a mixture thereof with cow butter.

7. The product of claim 1, in which stage (a) includes, as a final operation, homogenization of the emulsion under a pressure of 30–50 bar.

8. The product of claim 1, in which the emulsion resulting from stage (b) is cooled to 75°–80° C., homogenized at a pressure of 150–200 bar, and further cooled to 45°–55° C.

9. The product of claim 1, wherein said variation in viscosity at 40° C. of the condensed milk does not exceed 600 cps.

10. The product of claim 1, wherein a casein/serum protein ratio of the condensed milk is about 3.0:1.

* * * * *

UNITED STATES PATENT AND TRADEMARK OFFICE
CERTIFICATE OF CORRECTION

PATENT NO. : 4,298,625
DATED : November 3, 1981
INVENTOR(S) : Renzo Cillario

It is certified that error appears in the above—identified patent and that said Letters Patent is hereby corrected as shown below:

Column 2, Line 14, "to" should be --of--.
Line 19, "3,0:1" should be --3.0:1--.
Line 44, "cPs" should be --cps--.
Line 52, "12:1000" should be --12:100--.

Column 3, Line 16, "cPs" should be --cps--.
Line 65, "cPs" should be --cps--.

Column 5, Line 6, "98-99,5%" should be 98-99.5%--.

Column 7, Lines 9 and 19, "pasteurised" should be --pasteurized--.

Column 9, Line 2, "cool" should be --cools--.

Signed and Sealed this

Thirtieth Day of March 1982

|SEAL|

Attest:

GERALD J. MOSSINGHOFF

Attesting Officer     Commissioner of Patents and Trademarks